United States Patent Office 3,609,923
Patented Oct. 5, 1971

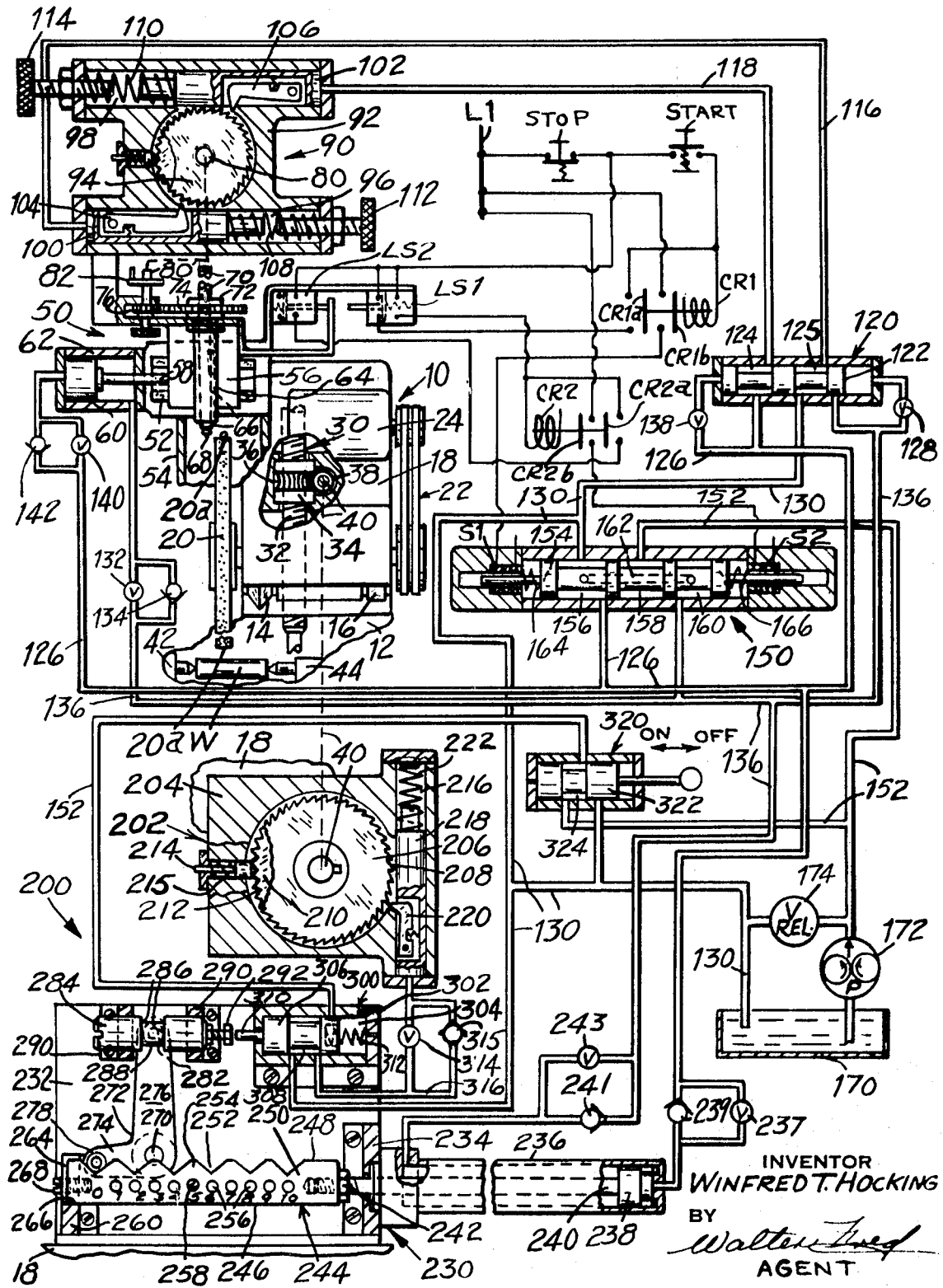

3,609,923
GRINDING WHEEL TRUING COMPENSATOR FOR GRINDING MACHINES
Winfred T. Hocking, Northboro, Mass., assignor to Norton Company, Worcester, Mass.
Filed Aug. 5, 1969, Ser. No. 847,624
Int. Cl. B24b 7/00
U.S. Cl. 51—5                                              5 Claims

ABSTRACT OF THE DISCLOSURE

A grinding machine having a grinding wheel truing compensating mechanism which advances the grinding wheel support in succeeding equal increments of the total amount of the truing tool feed, one increment at a time, until the truing tool feed is fully compensated for and the original final size position of the grinding face is reestablished. The compensating mechanism incudes a fluid motor traversing a camming bar with plurality of equally spaced cams thereon. The cams pivot a bell crank lever to actuate a valve which allows fluid pressure to actuate a ratchet mechanism with a non-adjustable fixed stroke which in turn rotates a worm and worm gear mechanism to advance the grinding wheel support a fine fixed increment. A removable stop pin is inserted into one of a plurality of equally spaced holes in the camming bar which limits the stroke and provides the required number of actuations of the ratchet mechanism necessary to equal the total predetermined amount of truing tool feed. The truing tool feed being a preset amount equal to or a multiple of the fine fixed increment.

BACKGROUND OF THE INVENTION (1) Field of invention

The invention relates to precision grinding machines and particularly to an automatic grinding wheel truing compensating mechanism therefor.

(2) Description of the prior art

With the necessity to grind parts to extremely close tolerances came a variety of grinding wheel precision fine feed mechanisms and controls to consistently feed and retract the grinding wheel a preset precise amount and precision intermittent and continuously operated truing devices adjustable to take a preset amount of either or both a coarse and a fine finishing cut to maintain the accuracy and configuration of the grinding face. However, in order to repeatedly grind a plurality of identical workpieces to a prescribed size within the limits required, with the same preset amount of grinding wheel feed, it became necessary to provide a compensating mechanism to advance the newly trued grinding face of the grinding wheel to its initial preset position relative to the finish size of the workpiece.

Complicated, expensive, adjustable compensating mechanisms, and controls to automatically compensate for changes in the size of the grinding wheel due to truing or dressing of the wheel, wheel wears, and truing tool wears are well known in the prior art and disclosed in the following United States patents: 2,192,308, 2,851,827, 2,895,265, 3,157,969, 3,171,234, 3,318,052 and 3,339,317.

The applicant's compensating mechanism is intermittently actuated during the truing cycle by a single ratchet mechanism, the ratchet pawl of which has a long, dependable, repeatable, nonadjustable fixed stroke. Each stroke produces a fine equal increment of the total truing tool feed. The prior art compensators have a ratchet mechanism with two adjustable ratchet pawls thereon, the stroke of which is short and advances the grinding wheel in a single continuous coarse increment equal to the total amount of the truing tool feed. They require more set up time, maintenance, and frequent readjustments to maintain accuracy than does the applicant's simpler, less costly and more dependable compensator.

SUMMARY OF THE INVENTION

The exact total amount a truing tool is advanced toward a grinding wheel to true a grinding face thereon during each complete truing cycle is compensated for by an intermittently actuated ratchet mechanism. The ratchet mechanism has a fixed stroke and rotates a worm and worm wheel mechanism that in turn produces relative rotational movement between a feed nut mounted on a grinding wheel support and a grinding wheel feed screw. Each stroke rotates the worm and worm wheel mechanism to advance the grinding wheel support a fixed amount relative to the feed screw, and a supporting base towards a workpiece support.

A cam bar with a plurality of equally spaced symmetrical cams and adjoining notches is slidably mounted for movement in opposite directions by a fluid operated cylinder actuated simultaneously with the actuation of each reciprocation of the truing tool over the grinding wheel face. A cam follower roll, upon engaging the cams, oscillates a bell crank lever that shifts a control valve allowing fluid pressure to actuate the ratchet mechanism a fixed amount. The number of actuations of the ratchet mechanism is controlled by inserting a removable stop pin in the proper predetermined one of a number of equally spaced holes in the cam bar. Each cam has a camming surface on each side of a high center point extending to a low point in the adjoining notches. There is respectively a stop pin hole for each camming surface and the spacing of the holes correspond to that of the high and low points of the camming surfaces along the camming bar. The control valve, and hence the ratchet mechanism are reset each time the cam follower roll is positioned within a notch and fully actuated at the high point of the cam between the notches. An adjustable fixed stop engages the removable stop pin and limits the stroke and the number of actuations in one direction and away from a starting position, the cylinder limits the return stroke and number of actuations in the opposite direction toward the starting position.

The compensating mechanism is put into operation by shifting a selector valve.

Prior to operating, the grinding wheel truing apparatus is adjusted to feed the truing tool a preset amount during each pass of the truing tool across the grinding face, exactly equal to at least one or more of the fixed fine feed increments imparted to the wheel support by the ratchet mechanism, and the sum of these amounts of truing tool feed during each complete truing cycle determines the number of the hole in the cam bar into which the stop pin is inserted.

BRIEF DESCRIPTION OF THE DRAWING

In the drawing is shown a wheel truing compensating mechanism and its associated actuating mechanism and controls, essential parts of a conventional truing apparatus, and parts of a grinding machine cooperating therewith.

DESCRIPTION OF THE PREFERRED EMBODIMENT(S)

In the drawing is shown a fragmentary portion of a conventional grinding machine 10 having a base 12 on which is slidable mounted on ways 14 and 16 a grinding wheel support or slide 18. A grinding wheel 20 is mounted on a rotatable spindle journalled in the grinding wheel slide 18 and driven by a conventional V-belt drive 22 and motor 24 on the wheel slide 18. The grinding machine 10 shown has a grinding wheel feed mechanism 30 that is substantially identical with that disclosed in U.S. Pat. 2,522,485 but may have a similar grinding wheel feed mechansim disclosed in U.S. Pat. 3,171,234, and to which reference may be had for details not disclosed herein and includes a rotatable feed screw 32 journalled in the base 12. A nut 34 meshes with the feed screw 32 and is as shown rotatably supported on and movable with the wheel slide 18. A worm gear or wheel 36 is formed on the exterior of the nut 34 and meshes with a worm 38 fixed to a rotatable shaft 40 journalled in the wheel slide 18. It will be apparent that the feed screw 32 is held against rotation by the worm 38 and that upon rotating the feed screw 32 in opposite directions the grinding wheel support 18 and the grinding wheel will be advanced towards and retracted away from a workpiece W supported by suitable conventional workpiece supporting means mounted on the base 12 such as the partially shown headstocks 42 and a footstock 44. Also rotation of the shaft 40 and worm 38 rotates the nut 34 relative to the feed screw 32 thereby moving the nut 34, with the grinding wheel support 18, and the grinding wheel axially along the feed screw relative to the base towards and away from the workpiece support means 42 and 44.

A conventional grinding wheel truing apparatus 50 is provided to dress and maintain the accuracy of the grinding face 20a of the grinding wheel 20. The truing device 50 may be one of many suitable types wherein the relationship between the grinding wheel and the truing tool is adjustable. Suitable truing devices which may be used are disclosed in U.S. 2,851,827 wherein multiple grinding wheels are trued and in U.S. Pat. 2,895,265 which is substantially the truing apparatus shown in the drawing and to which reference may be had for details not disclosed herein.

The grinding wheel truing device 50 is fixedly mounted on and movable with the grinding wheel slide 18 and comprises a slideway 52 fixed to a wheel guard housing 54 fixedly mounted on the wheel slide 18. A longitudinally movable slide 56 is supported on the slideway 52 and is fixed to a piston rod 58 of a piston 60 slideable in a cylinder 62 fixed to the slideway 52. On the slide is a sleeve 64 within which is slideably mounted a truing tool shaft 66 supporting a truing tool 68 at one end and having threads on an opposite end portion 70 engaging a rotatable feed nut 72 fixed against axial movement. The feed nut has gear teeth 74 meshing with a gear 76 fixed to a rotatable shaft 80 rotatable by hand wheel 82.

An adjustable ratchet feed mechanism 90 is provided for feeding the truing tool 68 a predetermined amount during a truing cycle and a preset increment toward the axis of the grinding wheel to be dressed before the truing tool engages the grinding face 20a The truing tool feed mechanism 90 comprises a body 92 fixed to the truing slide 56 and a ratchet wheel 94 with equally spaced ratchet teeth fixed to the shaft 80 within a chamber 1 in the body 92. In the body is a pair of substantially identical cylinders 96 and 98 and fluid pressure actuated pistons 100 and 102 slidably mounted therein. Spring urged ratchet pawls 104 and 106 are pivotally mounted within the pistons 100 and 102 to engage the teeth on opposite sides of the ratchet wheel 94. Compression springs 108 and 110 serve to hold and return the pistons to an inoperative position as shown. At opposite ends of the cylinder are adjustable stop screws 112 and 114 which limit the stroke of the pistons and hence the amount of truing tool feed. Normally, the stop screw 114 is preadjusted to allow the piston and the pawl 106 to travel a greater distance than the piston 100 and the pawl 104, and thereby advance the truing tool shaft 66 and feed the truing tool 68 a coarse and a fine increment toward the axis of the grinding wheel. Usually, a greater amount is trued off of the grinding face 20a on the first or rough pass and a lesser amount on the return or finish pass during each complete truing cycle. The setting of stop screws 112 and 114 determine how many teeth are picked by each ratchet pawl.

Fluid under pressure is passed to and exhausted from the cylinders 96 and 98 through pipes 116 and 118 connected to a shuttle valve 120 actuated by and in timed relation with the movement of the piston 60. The shuttle valve 120 comprises a slideably mounted valve spool 122 having spaced pistons between which are chambers 124 and 125. When fluid under pressure is passed through pipe 126 to the left slide of cylinder 62 and through the valve 120 and pipe 118, it simultaneously moves the piston 62 together with the truing tool 68 to the right, the valve spool 122 to the right, and the coarse feed piston 102 and ratchet pawl 106 to the left to impart a coarse increment of feed of the truing tool 68 before it engages the grinding face 20a.

The movement of the valve spool 122 to the right is controlled by a throttle valve 128 and as it moves it blocks off fluid under pressure from pipe 126 and allows the compression spring 110 to reset piston 102 and exhaust fluid from the cylinder 98 through pipe 118, chamber 124, and out the exhaust pipe 130. The rate at which the piston 60 and the truing tool 68 move to the right is controlled by a throttle valve 132 through which fluid exhausting from the right side of cylinder 62 must pass around a check valve 134 into pipe line 136.

Similarly, when fluid under pressure is passed into pipeline 136, to the right side of cylinder 62, through chamber 125 of the shuttle valve 120, and pipe 116, it simultaneously moves the piston 60 to the left on its return stroke together with the truing tool 68, the valve spool 122 now in the right hand position to the left and the fine feed piston 100 and ratchet pawl 104 to the right to impart a fine increment of feed of the truing tool 68 before it engages and finish trues the face 20a prior to performing a grinding operation on the workpiece W.

A throttle valve 138 controls the rate of fluid exhausting from the left side of the shuttle valve 120 into pipes 126 and hence the movement of the spool 122 toward the left. During this movement the pipe 136 is blocked and the pipe 116 is opened allowing the compression spring 108 to reset piston 100 and exhaust fluid through chamber 126 into exhaust pipes 130. The rate of movement of piston 60 on its return stroke to the left is controlled by a throttle valve 140 through which fluid exhausting from the left side of cylinder 62 must pass to get around a check valve 142 and into pipe line 126.

A conventional double solenoid actuated control valve 150 is provided which in one position directs fluid under pressure from a pipeline 152 to pipes 126 and simultaneously exhaust fluid from pipes 136 to pipe 130 and in another position directs fluid under pressure to pipes 136 and exhausts fluid from pipes 126 to pipe 130.

The control valve 150 comprises a slidably mounted valve spool 154 having a plurality of spaced pistons with chamber 156, 158 and 160 therebetween and a central passage 162 connecting chamber 156 with chamber 160. At opposite ends of the valve spool 154 are valve stems around which are compression springs 164 and 166 between the spool 154 and the valve body. The springs serve to hold the valve spool in a normal central position as shown. A pair of solenoids 51 and 52 are at opposite ends of the valve 150 and when actuated shift the valve spool in opposite directions to direct and exhaust fluid under pressure to and from the pipe lines 126 and 136 as described above.

Although the shuttle valve 120 is provided it is not absolutely necessary and may be eliminated if desired without affecting the operating of the ratchet mechanism 90 of the truing device. If it desired to eliminate the shuttle valve the lines 126 with the valve 138 therein connected line 118 and line 136 with valve 128 therein connected to line 116. The difference in operation would be that the ratchet pistons 100 and 102 would still be activated but remain activated and reset only when spool in the solenoid control valve 150 is shifted allowing fluid to be exhausted therethrough.

Fluid under pressure is supplied from a reservoir thereof within a tank 170 to the pipes 152 by a pump 172. A relief valve 174 maintains the desired fluid pressure in the pipes and excess fluid is returned to the tank 170 through an exhaust pipe 130.

Automatically operated compensating mechanism 200 and its associated controls connected to the fluid pressure system, is provided for intermittently and incrementally advancing in succeeding equal increments the grinding wheel slide 18 together with the grinding wheel 20 relative to the feed screw 32, the base 10, the workpiece support means 42 and 44, and the workpiece W a total amount equal to the predetermined amount of truing tool feed during each truing cycle. As previously described, the grinding wheel feed mechanism 30 includes a feed nut 34 engaging the feed screw 32, a worm gear 36 integrally formed therewith meshing with a worm 38 fixed to rotatable shaft 40 all of which cooperate with an are an essential part of the compensating mechanism 200.

The compensating mechanism 200 comprises a single non-adjustable pawl and ratchet mechanism 202, for rotating the shaft 40 a fixed amount, is mounted on and moveable with the grinding wheel support or slide 18. The pawl and ratchet mechanism 202 includes a housing 204 fixed to the wheel slide 18 and through which the shaft 40 or another shaft operatively connected thereto extends into a ratchet wheel 206 fixedly keyed thereto within a chamber in the housing.

On the ratchet wheel 206 are ratchet teeth 208 equally spaced around its circumferential pheripheral surface. Fixed to the underside of ratchet wheel 206 or formed integral therewith is a position retaining disc 210 of the same diameter with substanially V-shaped notches between detent teeth 212. The notches and the detent teeth are equally spaced around the circumferential pheripheral surface of the disc 210 a distance identical to the spacing between the ratchet teeth 208. The number of detent teeth 212 being equal to the number of ratchet teeth 208. A similarly V-shaped detent 214 is slideably mounted in the housing 204 and maintained in engagement with the teeth and notches of the disc 210 by a spring 215. When the ratchet wheel 206 is rotated a fixed number of ratchet teeth 208 the detent is forced out of the notches, rides over the detent teeth, and the retaining disc 210 is simultaneously advanced an identical number of notches whereupon the detent 214 maintains the position of ratchet wheel 206 and the shaft 40.

Adjacent the chamber in the housing 204 is a cylinder bore 216 in which is slideably mounted a piston 218 within which is pivotably mounted a spring pressed ratchet pawl 220 adapted for engaging the ratchet teeth 208. A spring 222 serves to reset and maintain the piston in the position shown. Every stroke of the piston 218 and the number of ratchet teeth 208 picked or advanced thereby is constant since there are no adjustable stops. The distance between the end of the piston 218 and an end cap fixed to the housing at the end of the cylinder bore is predetermined fixed amount sufficient to rotate the ratchet wheel 206 the required number of ratchet teeth which together with the proper gear ratios ultimately advances the grinding wheel a fixed fine increment of the total truing tool feed.

As an example, assume the ratchet wheel 94 and the gear train on the truing device are designed so that rotating the ratchet wheel one tooth feeds the truing tool .0005 of an inch and similarly rotating the ratchet wheel 206 of compensating mechanism one tooth and its associated gear train advances the grinding wheel slide 18 .000050 of an inch a ratio of 10 to 1. In order to fully compensate for the truing tool feed of .0005 of an inch, the stroke of the piston would have to be sufficient to pick exactly either one, two, five or ten teeth at a time and the piston actuated ten, five, twice and once respectively. However, during a typical truing operation the ratchet wheel 94 would normally be rotated a total of five teeth for a total truing tool feed of .0025 of an inch. With the stroke of the piston 218 preferably preset to rotate the ratchet wheel 206 ten teeth at a time (10×.000050=.00050), each stroke would advance the grinding wheel slide 18 .0005 of an inch which is equal to the feed of one tooth on the ratchet wheel 94. Therefore, five strokes of the piston 218 are required to equal the total truing tool feed of five teeth or .0025 of an inch.

Means are provided for intermittently actuating the non-adjustable pawl and ratchet mechanism 202 a predetermined number of times to incrementally advance the wheel slide 18 and thereby compensate for the total predetermined amount of truing tool feed. It comprises a cam activated control mechanism 230 which may be mounted on any suitable portion of the machine, but preferably supported on a base plate 232 which is fixedly mounted with conventional fasteners to a suitable surface on the wheel slide 18. Extending out from and adjacent one end of the base plate 232 is a flange or bracket 234 on which is fixedly mounted a fluid operated motor or cylinder 236, including a slideably mounted piston 238 and a piston rod 240 extending therefrom through a clearance hole in the bracket 234. The end of the piston rod is threaded through a lock nut 242 into one end of an elongated traversable saw tooth shaped camming bar 244 and locked in an adjusted position thereon by the nut 242. The camming bar has a bottom edge 246 substantially parallel to a top edge 248 and parallel side surfaces 250 extending between the top edge 248 and parallel side surfaces 250 extending between the top and bottom edges. On the top edge are a plurality of equally spaced identical symmetrical V-shaped notches 252 between and adjoining equally spaced identical symmetrical cams 254. As shown, there are six adjoining notches and five cams each with a short flat surface at the high center point of each cam coplanar with the top edge 248. Similarly, the low points of notches are substantially on a single plane. Each cam has a camming surface on each side of the high center point extending to the low center point in the adjoining notches.

Below the notches 252 and cams 254 are a plurality of identical equally spaced stop pin holes 256, into any one of which a removable stop pin 258 may be inserted and retained therein. The center distance between the axes of the holes 256 is one half the center distance between the high center point of a pair of cams 254 and hence a pair of notches. There is a hole 256 respectively for each of the camming surfaces and the spacing of the holes corresponds to the spacing of the high and low center points. The holes 256 are numbered 1 through 10 and spaced longitudinally of the camming bar with their axes parallel and on a single plane substantially parallel to the bottom surface 246. In the other direction, the axis of each hole is aligned vertically with a plane of symmetry of either a cam 254 or a notch 252. The odd number holes 1, 3, 5, 7, 9 are aligned with the cams and the even number holes with the notches, one of which, at the left hand end of the camming bar is not numbered and represents the zero starting point of the camming bar.

Adjacent the opposite end of the base plate 232 and extending outwardly therefrom, substantially parallel to the flange 234, is a guide plate 260 having a guideway or slot substantially as wide as the thickness of the bar 244. The guideway or slot has opposed spaced side bearing surfaces 264, only one of which is shown, and a bottom or bearing surface 266 for supporting and guiding the traversable camming bar 250 during its movement. An adjustable stop screw 268 is threaded through the guide plate 260 substantially in axial alignment with centers or central axes of the stop pin holes 256 and the stop pin 258. The adjusted position of the stop screw 268 is maintained by any conventional means such as a check nut or set screw not shown.

Oscillatable means movable by the cams is provided for alternately moving and allowing the piston 218 to reset each time the camming bar is reciprocated and includes: a pivot shaft 270 supported by the base plate 232 and on which is pivotally mounted a bell crank lever 272 having a short lever arm 274 and a long lever arm 276. On the lever arm 274 is rotatably mounted a cam follower roller 278 positioned in a notch 252 at the 0 starting position. On the end of the long lever arm 276 is rotatably mounted a roller 282 for shifting an adjustable valve operating shaft 284 having spaced opposed shoulders 286 engaged by the roller 282 at a reduced portion 288 between the ends of the shaft 284. The shaft 284 is slideably mounted within aligned bores in opposed spaced brackets 290 fixed to and extending out from the base plate 232. At one end of the operating shaft 284 is a lock nut and an adjustable screw 292 threaded into the shaft 284.

A fluid control valve 300 is provided for alternately actuating and resetting the ratchet mechanism 202. It comprises a cylinder body 302 fixed to the base plate 232, with a bore 304 and a slideably mounted valve spool 306 therein in axial alignment with the operating shaft 284. The spool 306 has spaced piston forming a chamber 308 therebetween and a stem 310 extending through one end of the body 302 to a position closely adjacent the adjustable screw 292. A spring 312 serves normally to urge the valve spool 306 to the left toward the adjustable screw 292, into a reset position shown.

In the position shown, fluid has exhausted from the cylinder 216 through a throttle valve 314, to bypass a check valve 315, pipe 316, chamber 308 into the exhaust pipe line 130 allowing the spring 222 to reset the piston 218 and fluid under pressure in line 152 is prevented from passing through the valve 300.

A manually activated compensator operating valve 320 is interposed into the fluid pressure pipe line 152 between the pump 172 and the control valve 300. It has a valve spool 322 with a pair of spaced pistons forming a chamber 324 through which fluid under pressure can pass in the operating On position shown. A hand knob is provided on one end of thespool 322 to shift the spool to either an On or Off position. By shifting the spool 322 to the right into an inoperative Off position, the fluid under pressure in line 152 is blocked off by one of the pistons and fluid may exhaust through chamber 324 to exhaust pipe line 130.

It can be seen that when the caming bar 244 is traversed in opposite directions the cam follower roller 278 ascends the inclined camming surfaces of the symmetrical cams 254 and the bell crank lever 272 is rocked clockwise whereby the valve operating shaft 284 begins to shift the spool 306 to the right. As the spool 306 moves to the right, it first closes off the port to exhaust pipe 130 and when the cam follower roller 278 is at the high point of the cam at top surface 248 the spool 306 is moved to fully open the port to the pressure line 152, thereby allowing fluid to pass into pipe 316, through a throttle valve 314 to actuate the ratchet mechanism 202 at a rate controlled by the valve 314.

Conversely, the valve spool 306 is shifted to the left and the bell crank rocked counter clockwise by the spring 312 when the cam follower 278 decends the inclined camming surfaces into the notches whereby the pressure ports are blocked off and the exhaust ports open thus allowing the ratchet mechanism 202 to reset.

As stated before the total number of actuatings of the compensating ratchet mechanism 202 during a truing cycle is determined by the position of the stop pin 258. When the pin 258 is in an odd numbered hole more actuations and increments of compensating feed will take place on the forward stroke to the left before the stop pin 258 engages the adjustably fixed stop screw 268 and one less that number of actuations taken on the forward stroke will take place on the return stroke to the right before the piston 238 bottoms in the cylinder 236. For example with the stop pin 258 in number 5 hole, there will be three actuations on the forward stroke and two on the return stroke for a total sum of five actuations. With the stop pin in an even numbered hole the same number of actuations and increments of compensating feed take place in either directions.

OPERATION

After initially setting up the truing apparatus and truing the face 20a of the grinding wheel, the grinding wheel feed mechanism is adjusted in the conventional manner by grinding a workpiece W to size and the conventional positive stop or in process gage set accordingly to prevent any further feeding movement of the grinding wheel and thereafter to retract the slide 18 a predetermined fixed amount. Assuming that each actuation of the piston 218 rotates the ratchet wheel 206 ten teeth to produce a compensating feed of .0005 of an inch that is equal to the truing tool feed produced by advancing the ratchet wheel 94 one tooth, thereby producing a ratio of tool feed to compensating feed of 1 to 1. The screw 114 on the ratchet mechanism 90 during the initial setting up of the truing apparatus was preset by the operator to rotate the ratchet wheel 94 four teeth on the first rough truing pass over the face 20a and screw 112 adjusted to pick and rotate the ratchet wheel 94 one tooth on the finishing return stroke of the truing tool 68 across the face 20a. The total amount of truing tool feed is five teeth or .0005×.0025 of an inch. To fully compensate for this amount, the stop pin 258 must be put into the number 5 hole since the total truing tool feed of .0025 divided by a compensating feed increment of .0005 equal 5 actuations which correspond to the number of teeth the truing tool is advanced. A simultaneous grinding wheel truing and compensating operation may be initiated by momentarily depressing a START button which closes an electrical circuit from line L1 to line L2 through a STOP button, the START button, and the coil of relay CR1 thereby energizes closing contacts CR1$^a$ and CR1$^b$. Contacts CR1$^b$ closes a circuit from line L1 to energize solenoid S1 and CR1$^a$ closes a circuit from line L1 through the normally closed contacts of a limit switch LS1 to hold relay CR1 and solenoid S1 energized. Solenoid S1 shifts valve spool 154 of valve 150 to the left allowing fluid under pressure to pass through chamber 158 from pipe line 152 into pipe line 126 and simultaneously to the left side of the truing cylinder 62, through a check valve 239 into the right side of cylinder 238 of the compensating mechanism 200, and to the left side of and through the chamber 124 of the shuttle valve 120 to the coarse feed cylinder 98 of the ratchet mechanism 90 on the truing device 50. The piston 102 together with the ratchet pawl 106 quickly rotates the ratchet wheel 94 four teeth and feeds the truing tool .002 of an inch toward the grinding wheel axis before engaging the face 20a. Subsequently, the shuttle valve moves to the right at a rate controlled by throttle valve 128 and allows the piston 102 to reset and fluid to exhaust therefrom; piston 60 traverses the truing tool 68 across the grinding face 20a and the piston 238 traverses, at a rate controlled by a throttle valve 243, the camming bar 244 which pivots the bell crank lever 272 thereby reciprocating the valve spool 306 to actuate the ratchet mechanism 202 intermittently until the stop pin engages the stop screw 268. With the stop pin in the number 5 position shown the ratchet wheel 206, shaft 40, and worm 38 will rotate the nut 34 relative to the feed screw 32 and move the grinding wheel slide 18 relative to the base toward the workpiece W, three equal fixed increments of .0005 of an inch each for a total of .0015 of an inch of compensation.

Movement of the truing slide 56 together with the truing tool 68 to the right allows the normally closed contacts of limit switch LS2 to close and when the truing tool 68 has completed the rough truing pass the truing slide actuates the limit switch LS1. The normally closed contacts of LS1 are opened which breaks the holding circuit thereby deenergizing relay CR1 and the solenoid S1 and a pair of normally open contacts of LS1 close to energize the coil of a relay CR2 thereby closing its contacts CR2$^a$ and CR2$^b$. When the contacts CR2$^a$ close a circuit from line L1 through the now normally closed contact of LS2 is completed to hold the relay CR2 energized. Closing of contacts CR2$^b$ energizes solenoid S2 which shifts the valve spool 154 to the right. Fluid under pressure from pipeline 152 now passes through chamber 158 of the valve spool 154 into pipelines 136 through chamber 125 in the valve spool 122 shifted previously to the right side of the control valve 120 and pipeline 116 to the left side of the fine feed ratchet cylinder 96. Piston 100 and the ratchet pawl 104 move to the right rotating the ratchet wheel 94 one tooth and feeding the truing tool 68 .0005 of an inch toward the grinding face 20a before engagement therewith. Fluid under pressure also goes to the right side of the shuttle 120 and moves the spool 122 to the left at a rate controlled by the throttle valve 138. The spool 122 blocks off the line 136 and allows the piston 100 to reset and exhaust fluid from line 116 to exhaust pipeline 130.

Fluid under pressure is simultaneously passed also through the check valve 134 to the right side of the cylinder 62 of the truing apparatus and through a check valve 241 to the left side of cylinder 236 of the compensator actuating mechanism 230. Piston 60 moves the truing slide 56 and the truing tool 68 to the left to finish true the grinding face 20a. The movement to the left is controlled by the throttle valve 140 and is slower than the movement of the piston 238 which is regulated by a throttle valve 237 to complete its final compensating stroke before the completion of the truing cycle. Fuid exhausts from the left side of cylinder 62 through line 126, chamber 156 and into exhaust pipe 130. As the truing slide 56 moves to the left, the normally open contacts of LS1 open and the normally close contacts close thus resetting it for the next truing cycle.

The piston 238 in cylinder 236 moves the camming bar 244 together with the stop pin 258 extending therethrough to the right and away from the stop screw 268. Fluid exhausts from the right side of cylinder 236 through the throttle valve 237, pipe 126, chamber 156, into the exhaust pipeline 130. During this movement the cam follower roller 278 moves from its position at the high point of the cam aligned with hole number 5 to the notch at the 0 starting position shown. During its movement, it first descends into the notch aligned with hole number 4 allowing the valve spool 306 and the piston 218 of ratchet mechanism 202 to reset and exhaust fluid therefrom through check valve 315 into pipeline 130. By the time the piston 238 bottoms against the cylinder 236, the cam follower roller 278 passes over two cams aligned with holes numbered 3 and 1, thereby actuating the ratchet mechanism 202 and producing two more equal increments of rotation of the ratchet wheel 206, shaft 40, worm 38, worm wheel 36 and the nut 34 relative to the feed screw 32. Each increment of rotation produces an increment of .0005 of an inch of movement of wheel slide 18 and the grinding wheel toward the workpiece W relative to the base. Therefore, two increments equal to .001 of an inch, plus the three previous increments equal to .0015 of an inch amount to a total of .0025 of an inch of compensating feed movement, exactly equal to amount of truing tool feed.

When the truing tool has finished truing the grinding face 20a, the truing slide actuates limit switch LS2 opening its normally closed contacts thereby deenergizing CR2 and solenoid S2, valve spool 154 centers as shown blocking of the fluid pressure line 152 and opening pipe lines 126 and 136 to exhaust pipe line 130 and thus terminates the truing and compensating cycle.

Upon completion of the truing cycle, the radius of the grinding wheel is less than its radius was at the completion of the last preceding truing operation by the amount of truing tool feed, and which has been fully compensated for and the original preset position of the grinding face 20a relative to the finish size of the workpiece is reestablished. A plurality of identical workpieces may now be ground to size without the need to readjust the grinding wheel feed mechanism and the initial setting of the positive stop or in process gages that terminate the grinding cycle and the forward movement of the grinding wheel into the workpiece W. However, the truing and compensating cycle must be initiated frequently enough to produce acceptable workpieces within the specified tolerances therefor.

Although for simplicity a manually operated truing device is disclosed, conventional means, such as an electric counter circuit may be provided to by-pass the START button and automatically initiate a truing and compensating cycle after a predetermined number of workpieces have been ground. Also means for continuously truing the grinding wheel face 20a may be provided. Such means may include an additional electrical circuit including wiring of the now closed normally open contacts of the limit switch LS2 in series with a conventional manually operated switch to by-pass the START button.

As stated above the grinding machine may be equipped with a similar grinding wheel feed mechanism disclosed in Pat. 3,171,234 wherein a feed nut 101 is fixed to a wheel slide 12 and engages a rotatable feed screw 102 in a base 10. Mounted on the base 10 instead of the wheel slide is a rotatable piston rod 123 having a worm 124 thereon engaging a worm wheel 125 about and keyed to one end of the feed screw 102. Relative motion between the nut 101 and the screw 102 is produced by either axially shifting the worm 124 with a fluid motor piston 121 or by rotating the worm 124 both of which rotates a worm wheel 125, and the feed screw 102 to advance the wheel slide relative to the screw 102 and the base 10. The compensating mechanism 200, the pawl and ratchet mechanism 202 of the invention disclosed hereinabove would be mounted on the base 10 and the ratchet wheel 206 and/or the shaft 40 coupled or geared to the shaft 123 in any suitable manner and by substituting it for the wheel truing compensating mechanism mounted in the assembly 65 shown in U.S. Pat. 3,171,234.

Both of the grinding wheel feed mechanisms referred to above have a feed screw, engaging a feed nut, and a rotatable worm and worm wheel mechanism to cause relative rotational movement between the feed nut and the feed screw for advancing the wheel slide and the grinding wheel relative to the base toward and away from a workpiece support means.

As many possible embodiments may be made of the above invention and as many changes might be made in the embodiment disclosed, it is to be understood that all math set forth hereinabove and shown in the accompanying drawing is to be interpreted as illustrative and not in a limiting sense.

I claim:
1. The combination with a grinding machine having
  a base;
  a grinding wheel slide on the base;
  a grinding wheel rotatably supported on the wheel slide;
  means on the base for supporting a workpiece opposite the grinding wheel;
  means, including a rotatable feed screw on the base and a feed nut on the wheel slide, for feeding the grinding wheel slide toward and away from the workpiece support means relative to the base;
  means on the wheel slide including a truing tool for truing a grinding face on the grinding wheel;
  means to feed the truing tool a predetermined amount during a truing cycle and
  wherein the improvement comprises: compensating means for intermittently and incrementally advancing the wheel slide toward the workpiece support means relative to the base in succeeding equal incre- ments during the truing cycle a total amount equal to the predetermined amount of the truing tool feed comprising
a non-adjustable ratchet mechanism including a housing on the wheel slide and having a chamber, and a cylinder bore adjacent the chamber;
means operatively connected to the grinding wheel feed means including a shaft extending into the chamber for producing relative rotation between the feed screw and the feed nut;
a ratchet wheel, having ratchet teeth, fixed to the shaft within the chamber;
a piston maintained normally in a reset position at one end of the cylinder bore and movable a fixed distance toward and away from an opposite end of the cylinder bore;
a ratchet pawl on the piston adapted to engage the ratchet teeth and rotate the ratchet wheel a fixed predetermined number of teeth each time the piston is moved the fixed distance toward the opposite end of the cylinder bore and move idly over the ratchet teeth each time the piston is moved away from the opposite end to the reset position;
means for moving the piston and the ratchet pawl together the fixed distance away from the opposite end of the cylinder bore to the reset position; and
means for actuating the ratchet mechanism intermittently a predetermined number of times to incrementally advance the wheel slide the total amount equal to the predetermined amount of the truing tool feed.

2. The combination according to claim 1 wherein the means for actuating the non-adjustable ratchet mechanism intermittently comprises:
a base plate having a guideway;
a stop on the plate adjacent the guideway;
an elongated camming bar in the guideway moveable relative to the stop and having,
a plurality of cams between adjoining notches extending longitudinally along the camming bar and each cam having a high center point and a low center point in the adjoining notches,
a camming surface on each side of the high center point of each cam extending to the low center point within the adjoining notches,
a plurality of numbered holes substantially parallel to each other spaced longitudinally of the camming bar, each hole located a predetermined distance from and in alignment with the stop, there being one hole respectively for each of the camming surfaces and the spacing of the holes correspond to the spacing of the high and low center points;
a stop pin adapted to be inserted into and retained in any one of the holes with a portion thereof extending outwardly from the camming bar sufficiently to engage the stop;
means for reciprocating the camming bar together with the stop pin away from a starting position into and out of engagement with the stop and back to the starting position during the truing cycle; and
oscillatable means, including a cam follower engaging the camming bar, moveable by the cams, for alternately moving and allowing the piston to reset each time the camming bar is reciprocated and the cam follower moved thereby to the high and low points of the camming surfaces;
whereby the stop pin and the number of the hole the stop pin is located in from the stop determines the amount of movement of the camming bar, the total number of activations of the piston, and the total number of equal increments the wheel slide is advanced during a truing cycle.

3. The combination according to claim 2 wherein the oscillatable means comprises:
a bell crank lever pivotally mounted on the base plate and having a pair of lever arms on one of which is mounted the cam follower; and
fluid control means, shiftable by another of the pair of lever arms, for allowing fluid under pressure to alternately pass into and exhaust from the cylinder bore as the bell crank lever is oscillated.

4. The combination according to claim 3 wherein the means for reciprocating the camming bar comprises:
a fluid operated cylinder fixed to the base plate;
a piston slideably mounted in the fluid operated cylinder in engagement with an end thereof in the starting position;
a piston rod, having one end fixed to the piston, extending through an opposite end of the fluid operated cylinder and fixed at an opposite end thereof to the camming bar; and
means, for simultaneously starting the truing cycle and reciprocating the piston in the fluid operated cylinder during the truing cycle.

5. The combination according to claim 4 wherein the means, operatively connected to the grinding wheel feed means comprises:
a worm operatively connected to be rotated by the shaft to which the ratchet wheel is fixed, and
a worm gear engaged by the worm.

References Cited

UNITED STATES PATENTS

| | | | |
|---|---|---|---|
| 3,060,647 | 10/1962 | Dall et al. | 51—165.14 |
| 3,157,969 | 11/1964 | Fant et al. | 51—65.14 |
| 3,318,052 | 5/1967 | Ruth | 51—165.14 |
| 3,403,480 | 10/1968 | Robillard | 51—165.14 |

WILLIAM R. ARMSTRONG, Primary Examiner

U.S. Cl. X.R.

125—11 CC; 51—165 TC, 165 PA